United States Patent
Takada et al.

(10) Patent No.: US 8,056,215 B2
(45) Date of Patent: Nov. 15, 2011

(54) METHOD FOR MANUFACTURING A STATOR COIL FORMED IN A CORRUGATED SHAPE

(75) Inventors: Masahiro Takada, Okazaki (JP); Kuniharu Teshima, Kariya (JP); Hideji Shimaoka, Anjo (JP); Toshiaki Oohara, Okazaki (JP)

(73) Assignee: Denso Corporation, Kariya (JP)

( * ) Notice: Subject to any disclaimer, the term of this patent is extended or adjusted under 35 U.S.C. 154(b) by 449 days.

(21) Appl. No.: 12/418,867

(22) Filed: Apr. 6, 2009

(65) Prior Publication Data

US 2009/0249613 A1  Oct. 8, 2009

(30) Foreign Application Priority Data

Apr. 7, 2008 (JP) ................................ 2008-099229
Mar. 25, 2009 (JP) ................................ 2009-074710

(51) Int. Cl.
*H01F 7/06* (2006.01)
(52) U.S. Cl. ...... 29/605; 29/606; 29/603.24; 242/365.3; 242/365.6; 242/365.8; 310/179; 310/184; 310/198; 310/199; 310/201
(58) Field of Classification Search ................ 29/602.1, 29/605, 606, 603.24, 603.26; 242/328, 329, 242/365.3, 365.6, 365.8, 366; 310/179, 184, 310/198–201, 210
See application file for complete search history.

(56) References Cited

U.S. PATENT DOCUMENTS

| | | | |
|---|---|---|---|
| 6,376,961 B2 * | 4/2002 | Murakami et al. | 310/184 |
| 6,844,636 B2 * | 1/2005 | Lieu et al. | 310/43 |
| 6,951,054 B2 * | 10/2005 | Hirota et al. | 29/596 |
| 2001/0019234 A1 * | 9/2001 | Murakami et al. | 310/180 |
| 2004/0040142 A1 | 3/2004 | Hirota et al. | |
| 2006/0005376 A1 | 1/2006 | Hirota et al. | |
| 2007/0180682 A1 * | 8/2007 | Ueda et al. | 29/596 |

FOREIGN PATENT DOCUMENTS

| | | |
|---|---|---|
| JP | 3894004 | 9/2003 |
| JP | 3894483 | 4/2004 |
| JP | 3894004 | 12/2006 |
| JP | 3894483 | 12/2006 |

\* cited by examiner

*Primary Examiner* — Paul D Kim
(74) *Attorney, Agent, or Firm* — Nixon & Vanderhye PC

(57) ABSTRACT

A first tool set holds a wire covered with an insulation film at a bending point of the wire to protrude the wire from the first tool set. A second tool set holds the protruded portion of the wire. The second tool set is rotated about the first tool set to bend the wire along a wall of the first tool set and to form a boundary corner in the wire at the same radius of curvature as the wall. The wire is released from the second tool set and is moved to place the first tool set at another bending point while protruding from the first tool set. The second tool set is placed at the protruded portion of the wire. When the wire is bent at a predetermined number of bending points and is rounded, a stator coil formed in a corrugated shape is manufactured.

9 Claims, 10 Drawing Sheets

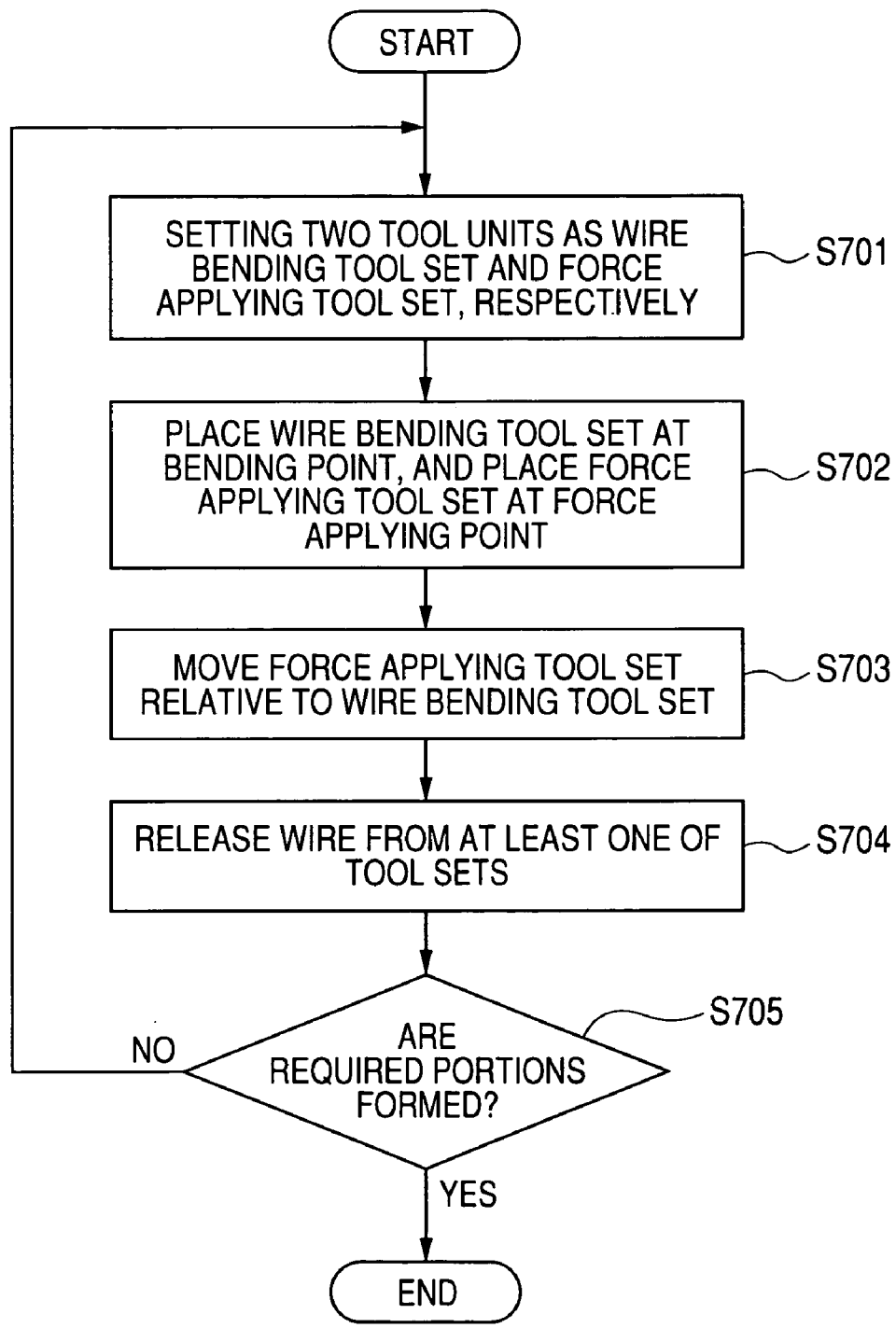

METHOD FOR MANUFACTURING A STATOR COIL FORMED IN A CORRUGATED SHAPE

CROSS-REFERENCE TO RELATED APPLICATION

This application is based upon and claims the benefit of priority of the prior Japanese Patent Application 2008-99229 filed on Apr. 7, 2008 and the prior Japanese Patent Application 2009-74710 filed on Mar. 25, 2009, so that the contents of which are incorporated herein by reference.

BACKGROUND OF THE INVENTION

1. Field of the Invention

The present invention relates generally to a method for manufacturing a stator coil of a stator of an electric rotating machine, and more particularly to the method for manufacturing the stator coil extending along the circumferential direction of the stator in a corrugated shape so as to insert slot accommodated portions of the coil into slots of a stator core and to protrude coil end portions of the coil from the slots.

2. Description of Related Art

Weight reduction in vehicles such as electric vehicles and hybrid vehicles is strongly required to improve fuel economy of the vehicles. High power motors (e.g., traction motors) generating electric power in electric and hybrid vehicles are very heavy. Therefore, to reduce the weight of vehicles having these high power motors, it is required to increase the output power (kW/kgw) per unit weight in the motor.

It is well known that the output power per unit weight of the motor increases with a slot occupying ratio in a stator of the motor. This stator has a stator core and a stator coil inserted into slots of the core. Each slot extends along the axial direction of the core and has a predetermined sectional area perpendicular to the axial direction. This slot occupying ratio is defined as the ratio of the sectional area occupied by the coil in one slot to the sectional area of the slot. In the conventional stator, many circular thin wires have been inserted into each slot. In this case, the slot occupying ratio is, for example, 40%. In contrast, if a square-shaped wire having a large sectional area can be used as a stator coil, the slot occupying ratio can be considerably increased.

Although circular thin wires can be wound on stator cores by using a general coil winding unit, large square-shaped wires cannot be wound on stator cores by using this winding unit. Further, it is difficult to bend the large square-shaped wire into the shape of a stator coil. To manufacture a stator while using a plurality of large square-shaped wires, each wire is bent in advance in a shape required to produce a stator coil, these bent wires are inserted into slots of a stator core, and the inserted wires are again bent to manufacture a stator with a stator coil. This method for manufacturing a stator from large square-shaped wires is, for example, disclosed in Japanese Patent No. 3894004.

In this Patent Specification, a plurality of conductive segments covered with insulation films are prepared, and a plurality of portions of each segment are simultaneously bent by using a die unit to form a U-shaped coil end portion in the segment. Then, each segment is inserted into two slots of a stator core. Then, the inserted segments are connected with one another while bending portions of the segments protruded from the slots. Therefore, a stator coil formed of the bent segments is manufactured. Each segment has two slot accommodated portions placed into the slots and two coil end portions protruded from respective axial ends of the core.

However, each wire is placed between male and female dies and is pressed with one stroke to form two boundary corners in the wire. Therefore, a tensile stress and a compression stress are inevitably applied on the portions of the wire. Further, these stresses are increased with the sectional area of the wire. Therefore, the withstand voltage of the insulation film at the bent portions is sometimes lowered. Especially, each segment has boundary corners each of which is placed between one slot accommodated portion and one coil end portion of the segment. Each boundary corner is curved approximately at a right angle. Therefore, it is difficult to prevent the insulating film of the coil from being damaged or broken, and there is a high probability that the withstand voltage of the insulation film is considerably lowered at the boundary corners of the coil.

Further, a large number at die units having different sizes are required to form the coil end portions of the segments. Therefore, the initial cost for manufacturing stator coils is considerably increased. More specifically, the coil end portion of each segment extends in the circumferential direction of the stator at one axial end side of the stator. The circumferential-directional length of the coil end portion placed at an outer side in the radial direction of the stator is larger than the length of the coil end portion placed at an inner side in the radial direction. Therefore, it is required to form the coil end portions of the segments at various lengths for each stator coil. To form the coil end portions having various lengths, a large number of die units having different shapes are required.

Moreover, when the size of the stator is changed in response to preparing the stator for a different model of vehicle, it is required to prepare other die units having different shapes. Therefore, the manufacturing cost of the stator coil is increased. Further, each time one segment is bent by using a die unit, the male and female dies collide with each other. Therefore, when the die unit is used for a long time, the die unit is easily worn. In this case, it is required to change the worn die unit with a new die unit, so that the manufacturing cost of the stator coil is further increased.

SUMMARY OF THE INVENTION

An object of the present invention is to provide, with due consideration to the drawbacks of the conventional method for manufacturing a stator coil, a method for manufacturing a stator coil extending in the circumferential direction of a stator in a corrugated shape while protecting an insulation film covering the coil from a bending device used for bending the coil.

According to an aspect of this invention, the object is achieved by the provision of a method for manufacturing a stator coil formed in a corrugated shape, comprising a coil forming stage and a coil inserting stage. At the coil forming stage, the stator coil formed in a planar shape is formed from a conductive wire, covered with an insulation film, to have a plurality of boundary corners at bending points of the wire and to have a plurality of slot accommodated portions and a plurality of coil end portions alternately arranged and divided by the boundary corners. At the coil inserting stage, the planar stator coil is rounded, and the slot accommodated portions of the rounded stator coil are inserted into slots of a stator core, while allowing the coil end portions of the stator coil to protrude from axial ends of the stator core, to manufacture the stator coil formed in the corrugated shape. The coil forming stage comprises a setting step, a placing step, a moving step and a releasing step which are repeatedly performed in that order to produce the stator coil having a predetermined number of boundary corners, formed one by one, from the wire. At the setting step, one of two tool units, each of which has a wall and an opening facing the wall, is set as a wire bending tool set, and the other tool unit is set as a force applying tool set. At the placing step, the wire bending tool set is placed at one of the bending points of the wire so as to allow a portion of the wire to protrude from the wire bending tool set by a predetermined length while putting the wire in the opening of the wire bending tool set, and the force applying tool set is placed at a force applying point of the protruded portion of the wire while putting the wire in the opening of the force applying tool set. At the moving step, the force applying tool set is moved relative to the wire bending tool set to apply a bending force onto the wire at the force applying point through the wall of the force applying tool set, to induce the wire to come in contact with the wall of the wire bending tool set at the bending point, and to bend the wire at the bending point in response to the bending force while forming one boundary corner of the wire at the bending point and forming one slot accommodated portion or one coil end portion substantially having the predetermined length between the boundary corner and another boundary corner previously formed. At the releasing step, the wire is released from at least one of the tool sets.

With this manufacturing method of the stator coil, the boundary corners are formed one by one at the bending points of the wire at the coil forming stage to produce a planar stator coil from the wire. At the coil forming stage, each time the setting step, the placing step, the moving step and the releasing step are performed in that order, one boundary corner is formed. Therefore, this series of steps is repeatedly performed to produce the stator coil having a predetermined number of boundary corners.

Each time one boundary corner is formed, two tool units are, respectively, set as a wire bending tool set and a force applying tool set. Therefore, a tool unit used as a wire bending tool set may be used as a force applying tool set, and the other tool unit used as a force applying tool set may be used as a wire bending tool set.

At the moving step, the force applying tool set is moved relative to the wire bending tool set. Therefore, both the tool sets may be moved, or only the force applying tool set may be moved.

At the releasing step, the wire is released from at least one of the tool sets. Therefore, the wire may be released from both the tool sets, or the wire may be released from either the force applying tool set or the wire bending tool set.

Therefore, because the boundary corners of the wire are formed one by one, a tensile stress and/or a compression stress applied on the insulation film of the coil can be considerably reduced. Further, during the formation of the boundary corners in the wire, no bending tool collides with the wire, or the wire is not tightly placed between bending tools. Therefore, the stator coil receives hardly any mechanical impact. Accordingly, the stress applied on the insulation film of the stator coil can be reduced to be lower than the allowable level of stress in the insulation film, the insulation film of the stator coil is not damaged or broken, and yield rate improvement can be obtained in the manufacturing of the stator coil.

Further, in this method, because the boundary corners of the wire are formed one by one, the bending operation can be simplified, and a bending device with the too units can be simplified.

Moreover, because the boundary corners of the wire are formed one by one, the length of each coil end portion divided by two boundary corners can be easily set, and the length of each slot accommodated portion divided by two boundary corners can be easily set. Therefore, the coil end portion placed on the inner side of the stator core in the radial direction can be set at a shorter length, and the coil end portion placed on the outer side of the stator core in the radial direction can be set at a longer length. Accordingly, the size of the stator coil can be appropriately adjusted even when the size of the stator core is changed.

Furthermore, because the wire is merely held in the opening of the tool sets at the placing step, the wire can be easily released from one tool set by merely lifting up the tool set, and the wire can be easily held in the opening of one tool set by merely rotating about the other tool set or moving straight and putting down the tool set. These linear and rotational movements of the tool set are simple. Accordingly, the bending device with the two tool units can be further simplified, the stator coil can be manufactured at low cost, and the productivity of the stator coils can be improved.

Still further, one tool unit is used to apply the bending force to the wire, and the other tool unit is used to bend the wire in response to the bending force. Accordingly, the bending operation using the tool units can be simplified.

BRIEF DESCRIPTION OF THE DRAWINGS

FIG. 7 is a flow chart showing the formation of a stator coil formed in a corrugated and planar shape according to the embodiments;

DETAILED DESCRIPTION OF THE PREFERRED EMBODIMENTS

Figure 1:
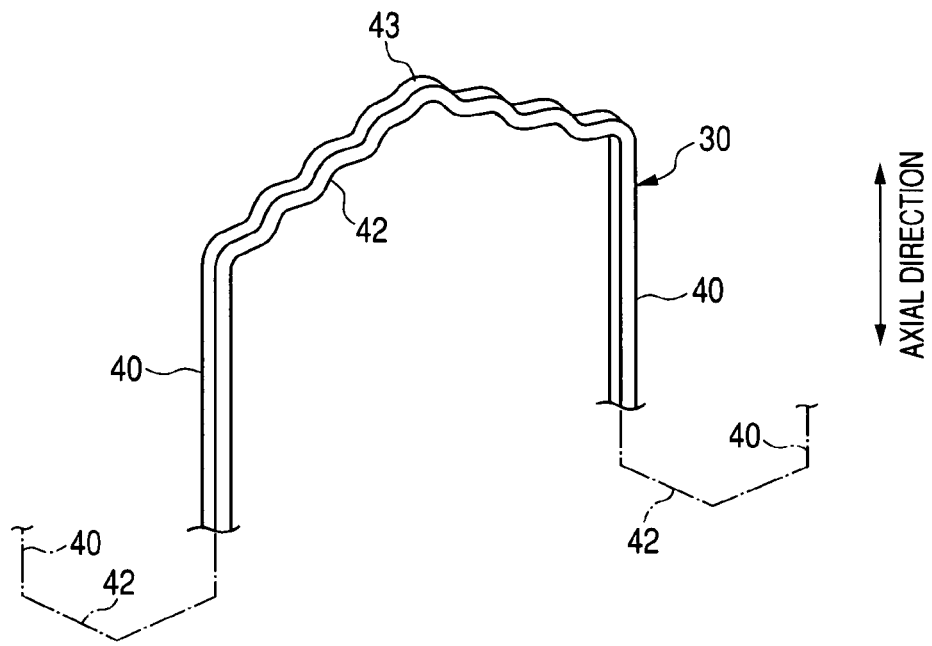
FIG. 1 is a perspective side view showing a portion of a stator coil formed in a corrugated shape according to embodiments of the present invention.

Embodiments of the present invention will now be described with reference to the accompanying drawings, in which like reference numerals indicate like parts, members or elements throughout the specification unless otherwise indicated.

FIRST EMBODIMENT

Figure 2:
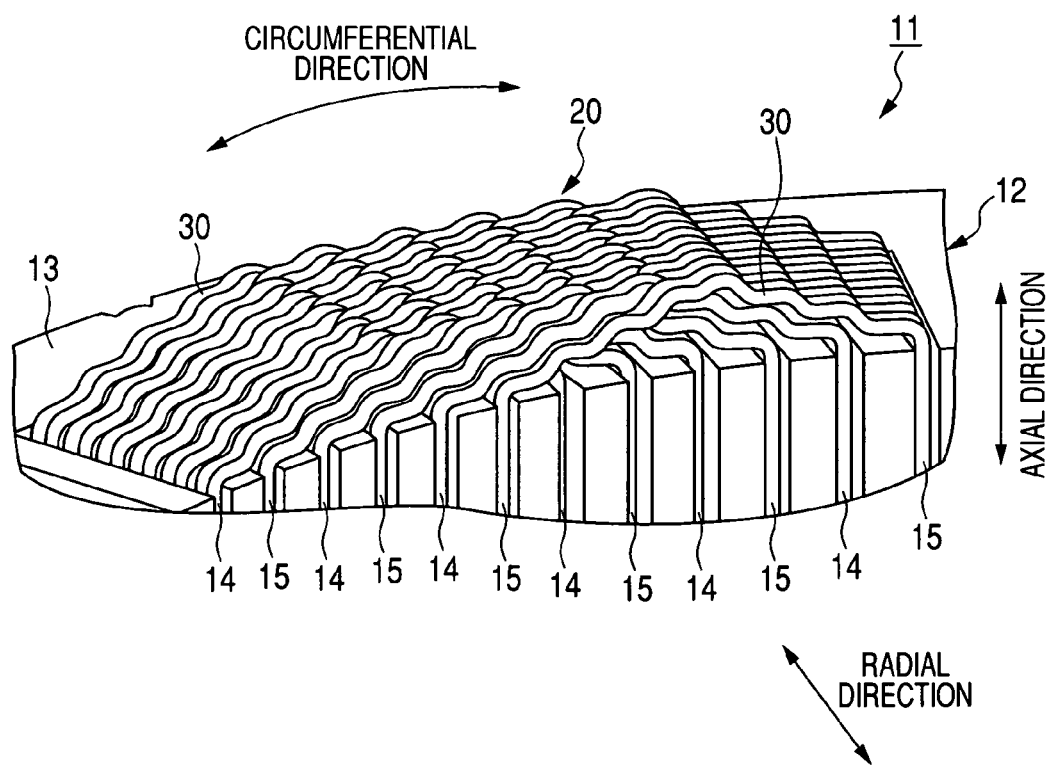
FIG. 2 is a perspective side view showing coil end portions of the stator coil placed on one axial end of a stator core.

FIG. 1 is a perspective side view showing a portion of a stator coil formed in a corrugated shape, while FIG. 2 is a perspective aide view showing coil end portions of the stator coil placed on one axial end of a stator core, A stator 11 shown in FIG. 2 is, for example, disposed in an electric rotating machine (e.g., a motor having an inner and a rotor) of a vehicle.

As shown in FIG. 1 and FIG. 2, the stator 11 has a stator core 12 and a three-phase stator coil 20 wound on the core 12. The core 12 is formed approximately in a cylindrical shape. The core 12 has slots 14 and alternately arranged along the circumferential direction of the core 12. Each slot is opened on the inner side in the radial direction of the core 12. Each slot penetrates through the core 12 in the axial direction of the core 12.

The coil 20 is formed in a corrugated shape while extending in the circumferential direction. The coil 20 penetrates the slots 14 and 15. In this embodiment, for example, the coil 20 is formed in a cranked shape like a series of U shapes. The coil 20 is obtained by connecting two or four three-phase coils in series or in parallel to one another, and each three-phase coil has three phase windings connected with one another in the Y connection, the Δ connection or the like. Each phase winding of the coil 20 is formed by repeatedly bending a conductive wire 30 having a rectangular sectional area. This wire 30 is covered with an insulation film. Three phase currents forming the three-phase alternating current flow through the respective phase windings of each three-phase coil. The phase currents flowing through two portions of the coil 20 inserted into the slots 14 and 15 adjacent to each other have the same phase.

The wire 30 has slot accommodated portions 40 inserted into the respective slots 14 and 15 of the core 12 and coil end portions 42 protruded from the slots 14 and 15 and placed over an end surface 13 of the core 12 in the axial direction of the core 12. The slot accommodated portions 40 and the coil end portions 42 are alternately placed in the wire 30. Each coil end portion 42 connects two slot accommodated portions 40 of two slots 14 or 15 placed away from each other by one magnetic pole pitch and extends in the circumferential direction and the axial direction.

Each coil end portion 42 is deformed in a stair-stepped shape to be gradually away from the end surface 13 of the core 12 and to place the center 43 of the portion 42 at a position furthest away from the end surface 13 of the core 12. The center 43 of each coil end portion 42 is bent to be shifted in the radial direction by the thickness of the wire 30 in the radial direction. Therefore, one half of the portion 42 is shifted from the other half of the portion 42 in the radial direction so as to place a large number of coil end portions 42 on each axial end of the core 12.

Each slot accommodates a plurality of slot accommodated portions 40 arranged along the radial direction in a multi-layer. Therefore, the coil end portions 42 placed on each axial end of the core 12 form a plurality of layers in the radial direction. Further, the distance of two slots in the circumferential direction is larger on the outer side in the radial direction than that on the inner side in the radial direction. Therefore, the length of the coil end portion 42 in the circumferential direction depends on the position of the portion 42 in the radial direction. That is, the coil end portions 42 have various lengths in the circumferential direction.

Further, the wire 30 has boundary corners each of which is placed between one slot accommodated portion 40 and one coil end portion 42 and is placed out of the slot 14 or 15. Each boundary corner is curved approximately at the right angle to lower the height of the coil end portions 42 in the axial direction. Therefore, the length of the stator 11 in the axial direction can be shortened.

In this embodiment, a plurality of slot accommodated portions 40 of the wire 30 are arranged in a line in each slot. However, the slot accommodated portions 40 may be arranged in a matrix shape in each slot.

Figure 3:
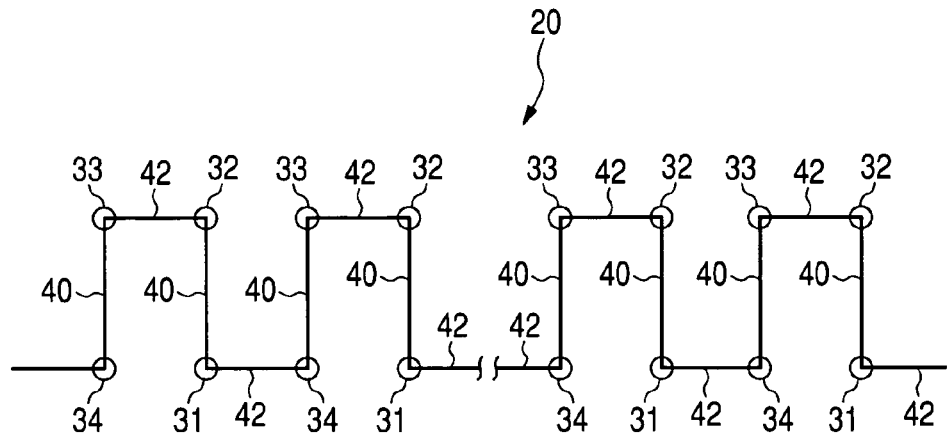
FIG. 3 is a view schematically showing a conductive wire bent in a cranked shape and formed in a planar shape according to the embodiments.

Next, the method for manufacturing the stator coil 20 formed in a corrugated shape while extending in the circumferential direction is now described below. FIG. 3 is a view schematically showing one conductive wire 30 bent in a cranked shape representing the corrugated shape and formed in a planar or development shape.

One conductive wire 30 is drawn out from a wire drum (not shown), and the wire 30 is bent at each of bending points approximately by an angle of 90 degrees by using a bending device (coil bending stage). Therefore, as shown in FIG. 3, a plurality of boundary corners 31, 32, 33 and 34 are formed one by one at the bending points, and the wire 30 bent in a cranked shape is formed. Each time the wire 30 is bent, one slot accommodated portion 40 or one coil end portion 42 is formed. The slot accommodated portions 40 and the coil end portions 42 are alternately arranged in the coil 20 and are divided by the boundary corners 31 to 34. Each of the coil end portions 42 placed at one axial end of the core 12 is connected with two slot accommodated portions 40 through two boundary corners 32 and 33, and each of the coil end portions 42 placed at the other axial end of the core 12 is connected with two slot accommodated portions 40 through two boundary corners 31 and 34.

Each coil end portion 42 has a changeable length corresponding to the circumferential distance between two slots 14 or 15, in which two slot accommodated portions 40 connected with the portion 42 are inserted, at the position of the portion 42 in the radial direction. In contrast, each slot accommodated portion 40 has a fixed length corresponding to the axial length of the slot.

Thereafter, as shown in FIG. 1, each coil end portion 42 of the wire 30 is deformed in a stair-stepped shape (coil end shape forming stage). Therefore, one phase winding is formed. In the same manner, other two phase windings are formed. In this embodiment, the portion 42 is bent in the stair-stepped shape. However, the portion 42 may be bent in a well-known coil end shape.

Thereafter, three phase windings are connected with one another to form a single and planar three-phase coil. Another three-phase coil is formed in the same manner.

Thereafter, two three-phase coils are connected with each other to form one three-phase stator coil, and two three-phase stator coils are connected with each other to form the planar stator coil 20 in a planar shape. Then, the stator coil 20 is rounded to be formed in a cylindrical shape. Therefore, the three-phase stator coil 20 is formed and manufactured in the corrugated shape while being extended in the circumferential direction.

Thereafter, the stator coil 20 is inserted into the slots 14 and 15 of a plurality of teeth of a plurality of divided cores or an open slot type full cores. Then, the teeth with the stator coil are covered with a plurality of back yokes formed in the cylindrical shape to manufacture the stator 11.

As described above, in this manufacturing method, the boundary corners 31 to 34 are formed in the wire 30 one by one by repeatedly bending the wire 30 to form the coil end portions 42 and the slot accommodated portions 40 alternately arranged and divided by the portions 31 to 34. Each coil end portion 42 is deformed in the stair-stepped shape. Accordingly, tensile stress and/or compression stress applied on the wire 30 can be reduced at the bending and forming stages, so that the insulation film of the stator coil 20 can be protected from a bending device at these stages.

Further, because the boundary corners 31 to 34 of the wire 30 are formed one by one at the coil bending stage by using a bending device, the structure of the bending device can be simplified, and the bending operation using the bending device can be simplified and be easily performed so as to reduce the tensile stress and/or the compression stress applied on the insulation film of the wire 30.

Figure 4:
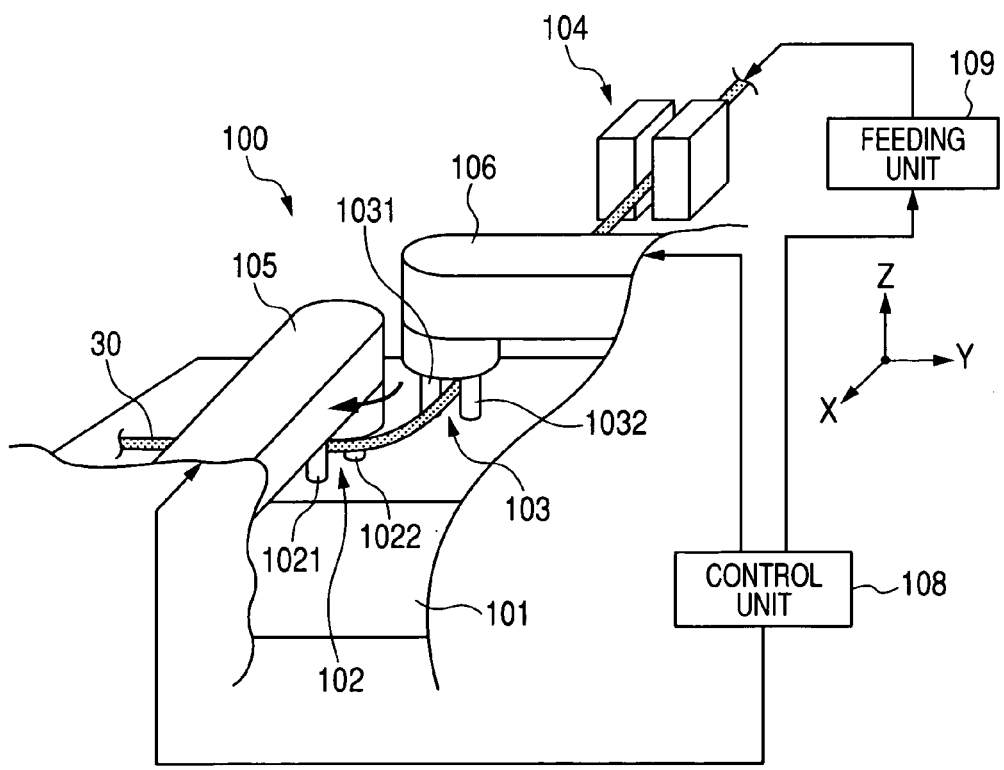
FIG. 4 is a perspective side view of a bending device for bending the wire according to the embodiments.

FIG. 4 is a perspective side view of a bending device 100 for bending the wire 30 approximately by an angle of 90 degrees.

As shown in FIG. 4, the bending device 100 has a table 101, a first moving member (i.e. a member of a tool driving unit) 105, a second moving member (i.e., another member of the tool driving unit) 106, a first tool unit 102 detachably attached to the top portion of the moving member 105, a second tool unit 103 detachably attached to the top portion of the moving member 106, a guide unit 104 for guiding the wire 30 to the tool unit 103, a feeding unit 109 for feeding the wire 30, and a control unit 108 for controlling the operation of the bending device 100. Each of the moving members 105 and 106 moves the corresponding tool unit 102 or 103 on the table 101 and lifts up and puts down the tool unit. As each of the members 105 and 106, a robot hand movable in three dimensions is used. However, the members 105 and 106 may be used only for this tool device 100.

The guide unit 104 has two quadrangular prisms spaced from each other at a predetermined interval, and the wire 30 is placed between these prisms and extends toward the tool unit 103 placed on the table 101. The tool unit 102 has two columnar bending tools 1021 and 1022 extending in parallel to each other toward the upper surface of the table 101 along the Z-direction orthogonal to the surface of the table 101. The tools 1021 and 1022 are spaced from each other at a predetermined interval to form an opening. The tool unit 103 has two columnar bending tools 1031 and 1032 extending in parallel to each other toward the upper surface of the table 101 along the Z-direction. The tools 1031 and 1032 are spaced from each other at a predetermined interval to form an opening. The wire 30 extending from the guide unit 104 passes through the opening of the tool unit 103. The wire 30 protruding from the tool unit 103 passes through the opening of the tool unit 102.

Figure 5:
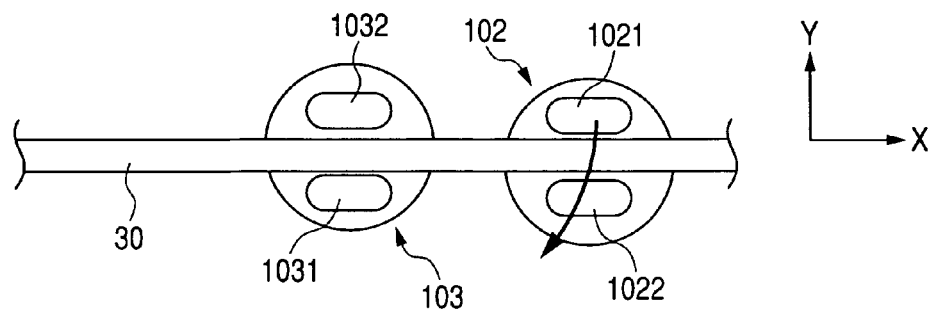
FIG. 5 is a view schematically showing the wire not yet bent.
Figure 6A:
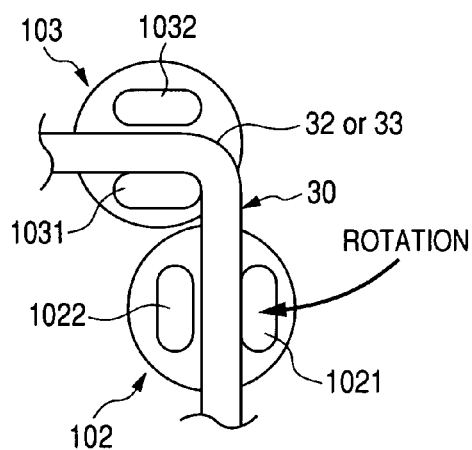
FIG. 6A is a view schematically showing the wire bent clockwise by the bending device.
Figure 6B:
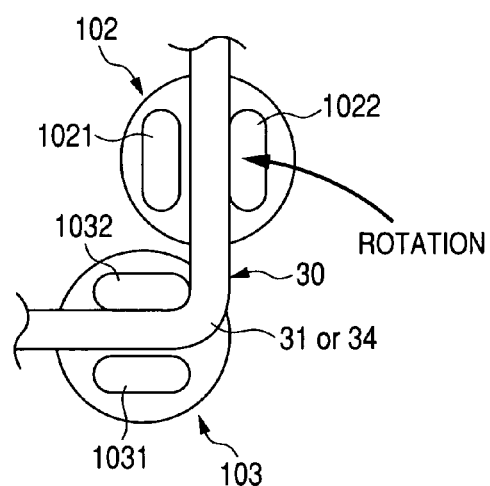
FIG. 6B is a view schematically showing the wire bent counterclockwise by the bending device.

The formation of one boundary corner in the wire 30 will be described with reference to FIG. 4 to FIG. 6. FIG. 5 is a view schematically showing the wire 30 not yet bent. FIG. 6A is a view schematically showing the wire 30 bent clockwise by the bending device 100, while FIG. 6B is a view schematically showing the wire 30 bent counterclockwise by the bending device 100.

As shown in FIG. 5 and FIG. 6A, each of the bending tools 1021, 1022, 1031 and 1032 is formed approximately in an elliptic columnar shape so as to have two flat side walls being parallel to each other. In each of the tool units 102 and 103, two flat side walls of the bending tools facing each other through the opening are parallel to each other. More specifically, the sectional area of each bending tool in the X-Y plane parallel to the upper surface of the table 101 is formed by two straight lines being parallel to each other, a half-circle connecting the straight lines at one side of the lines and another half-circle connecting the straight lines at the other side of the lines.

Before bending the wire 30, as shown in FIG. 5, the first tool unit 102 is set as a force applying tool set, and the second tool unit 103 is set as a wire bending tool set. Then, the tool sets 102 and 103 are arranged so as to place the openings of the tool sets 102 and 103 in line. Then, the wire 30 is placed into the openings of the tool sets 102 and 103 to extend straight through the tool sets 102 and 103 and to be protruded by a predetermined length from the tool set 103 in the extending direction X of the wire 30.

Thereafter, as shown in FIG. 4 and FIG. 6, the moving member 105 rotates the tool set 102 about the tool set 103 horizontally on the table 102 by an angle of 90 degrees while the moving member 106 fixes the tool set 103 placed approximately at the center of this rotation. Due to this rotation, the flat side walls of the tools 1021 and 1022 of the tool set 102 become perpendicular to the flat side walls of the tools 1031 and 1032 of the tool set 103. The rotational direction is indicated by arrows of FIG. 4 and FIG. 5.

Therefore, as shown in FIG. 4 and FIG. 6A, when the tool set 102 applies a bending force on the wire 30 to bend the wire 30 clockwise, the wire 30 comes in face-to-face contact with one flat side wall of the bending tool 1031 of the tool set 103 and one flat side wall of the bending tool 1021 of the tool set 102, a portion of the wire 30 comes in face-to-face contact with one half-circle side wall of the bending tool 1031, and the portion of the wire 30 is bent clockwise approximately by an angle of 90 degrees to form one boundary corner 32 or 33 in the wire 30. The curved shape of the half-circle side wall is transferred to this boundary corner. Therefore, this boundary corner 32 or 33 has the same radius of curvature as the half-circle side wall. This boundary corner 32 or 33 has two quarter-circle side walls on the inner and outer sides thereof.

During this curved shape transfer, no tool collides with the wire 30 placed on the tool unit 103, so that the tensile stress and/or the compression stress applied on the insulation film of the wire 30 are considerably reduced.

Further, as shown in FIG. 6B, each time a bending force is applied on the wire 30 to bend the wire 30 counterclockwise, one boundary corner 31 or 34 is formed in the wire 30 in the same manner as the portion 32 or 33.

Next, the production of the stator coil 20 will be described with reference to FIG. 7. FIG. 7 is a flow chart showing the production of the stator coil 20, formed in a corrugated shape and a planar shape, at the coil bending stage.

As shown in FIG. 7, the coil bending stage has a setting step S701, a placing step S702, a moving step S703, a releasing step S704 and a judging step S705.

At the setting step S701, one of the first and second tool units 102 and 103 is set or selected as a wire bending tool set, and the other tool unit is set or selected as a force applying tool set. In this embodiment, the first tool unit 102 is always set as a force applying tool set, and the second tool unit 103 is always set as a wire bending tool set.

At the placing step S702, the wire bending tool set 103 is placed at one bending point of the wire 30 to protrude a straight portion of the wire 30 by a predetermined length from the tool set 103 and to put the wire 30 in the opening of the tool set 103, and the force applying tool set 102 is placed at a force applying point of the protruded portion of the wire 30 to put the wire 30 in the opening of the tool set 102. For example, the wire 30 is moved to protrude from the tool set 103 by the predetermined length.

At the moving step S703, the force applying tool set 102 is moved relative to the wire bending tool set 103 to apply a bending force onto the wire 30 at the force applying point through the wall of the tool set 102, to induce the wire 30 to come in contact with the wall of the tool set 103 at the bending point, and to bend the wire 30 at the bending point approximately at an angle of 90 degrees in response to the bending force while forming one boundary corner of the wire 30 at the bending point and forming one slot accommodated portion 40 or one coil end portion 42 substantially having the predetermined length between the newly-formed boundary corner and another boundary corner previously formed. For example, the force applying tool set 102 is rotated about the wire bending tool set 103. In this embodiment, the tool set 102 is moved, while the tool set 103 is fixed.

At the releasing step S704, the wire 30 is released from at least one of the tool sets 102 and 103. In this embodiment, the set 102 is released from the wire 30.

At the judging step S705, the control unit 108 judges whether or not a predetermined number of slot accommodated portions 40 and a predetermined number of coil end portions 42 required for the stator coil 20 have been formed at the steps S701 to S704. When the required portions 40 and 42 are not formed, the procedure returns to step S701 to form one slot accommodated portion 40 or one coil end portions 42 at the steps S701 to S704. For example, each time the clockwise rotation of the force applying tool set 102 at the moving step S703 is performed twice, the counterclockwise rotation of the force applying tool set 102 at the moving step 5703 is performed twice. In contrast, when the required portions 40 and 42 have been formed, the production of the stator coil 20 formed in a corrugated shape and a planar shape is completed.

An example of the production of the stator coil 20 will be described with reference to FIG. 8 to FIG. 16. Each of FIG. 8, FIG. 10, FIG. 12, FIG. 14 and FIG. 16 is a view schematically showing the positional relationship among the tool sets 102 and 103 and the wire 30 at the placing step S702, while each of FIG. 9, FIG. 11, FIG. 13 and FIG. 15 is a view schematically showing the positional relationship among the tool sets 102 and 103 and the wire 30 at the moving step S703.

Figure 8:
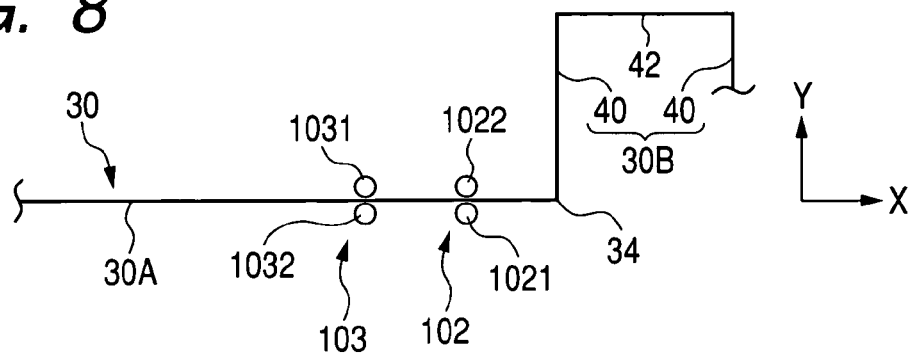
FIG. 8 is a view schematically showing the positional relationship among tool sets of the tool device and a wire at a placing step according to the first embodiment.

As shown in FIG. 8, the wire 30 has a straight portion 30A not yet bent and a bent portion 30B placed on one end side of the wire 30. For example, to form one coil end portion 42 of the stator coil 20, the straight portion 30A of the wire 30 placed in the opening of the tool set 103 is protruded from the tool set 103 in the extending direction X by a first changeable length to place the tool set 103 at the first bending point of the wire 30, and the tool set 102 is placed at a force applying point of the protruded portion 30A to hold the protruded portion 30A in the opening thereof (placing step S702).

Figure 9:
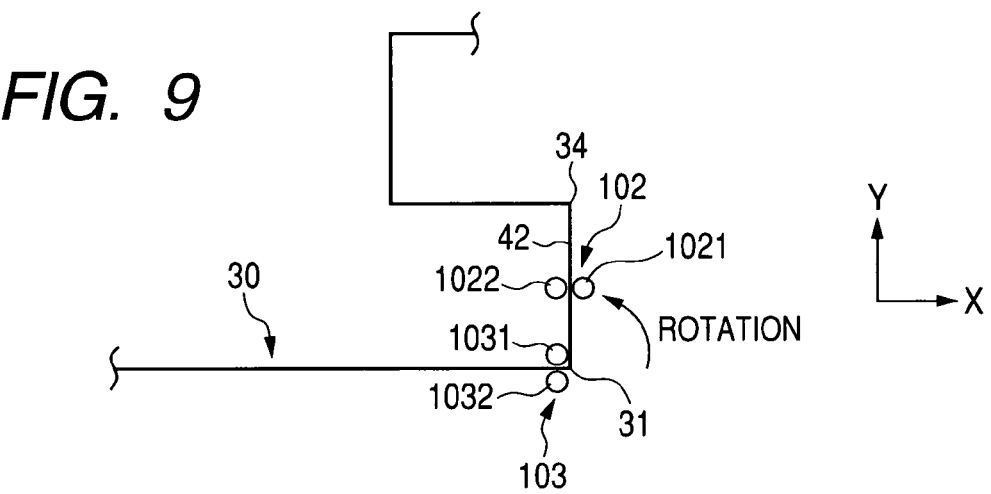
FIG. 9 is a view schematically showing the positional relationship among the tool sets and the wire at a moving step according to the first embodiment.

Thereafter, as shown in FIG. 9, the tool set 102 is rotated counterclockwise about the tool set 103 to bend the wire 30 at the first bending point by an angle of 90 degrees (moving step S703). Therefore, one boundary corner 31 is newly formed at the first bent point of the wire 30, and one coil end portion 42 to be placed on one axial end of the core 12 (see FIG. 2) is formed between the newly-formed portion 31 and the boundary corner 34 previously formed. Then, the tool set 102 is lifted up to release the wire 30 from the tool set 102 (releasing step S704).

Figure 10:
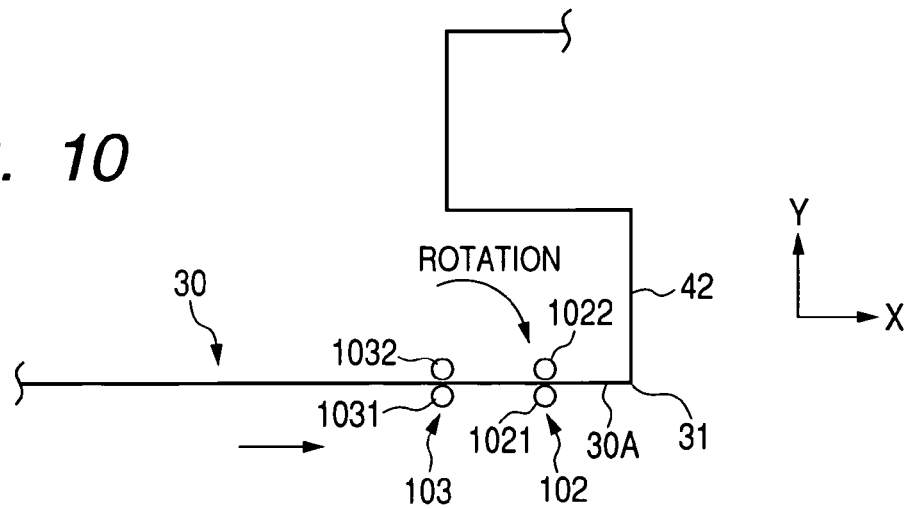
FIG. 10 is a view schematically showing the positional relationship among the tool sets and the wire at the placing step.

Thereafter, as shown in FIG. 10, the wire 30 is moved in the extending direction X by a fixed length to place the tool set 103 at the second bending point of the wire 30 (placing step S702). Therefore, the straight portion 30A of the wire 30 is protruded from the tool set 103 in the extending direction X by the fixed length. Then, the tool set 102 is returned to a force applying point of the wire 30. More specifically, the tool set 102 is rotated about the tool set 103 clockwise by an angle of 90 degrees and is put down or lowered so as to place the protruded portion 30A of the wire 30 between the bending tools 1021 and 1022 of the tool set 102.

Figure 11:
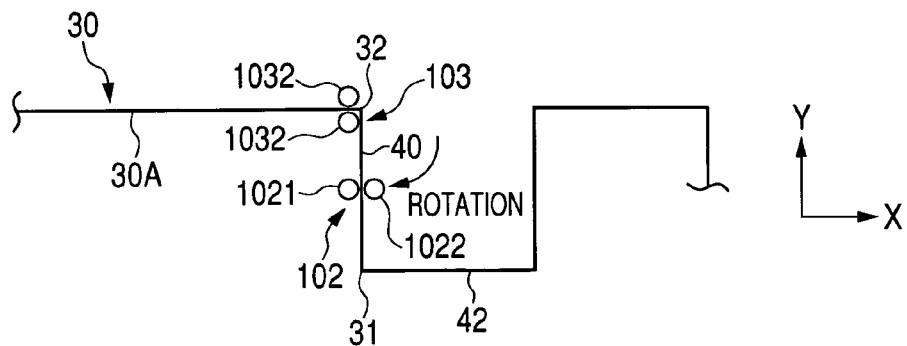
FIG. 11 is a view schematically showing the positional relationship among the tool sets and the wire at the moving step.

Thereafter, as shown in FIG. 11, the tool set 102 is rotated clockwise about the tool set 103 to bend the wire 30 at the second bending point by an angle of 90 degrees (moving step S703). Therefore, one boundary corner 32 is newly formed at the second bending point of the wire 30, and one slot accommodated portion 40 is formed between the newly-formed portion 32 and the boundary corner 31 previously formed. Then, the tool set 102 is lifted up to release the wire 30 from the tool set 102 (releasing step S704).

Figure 12:
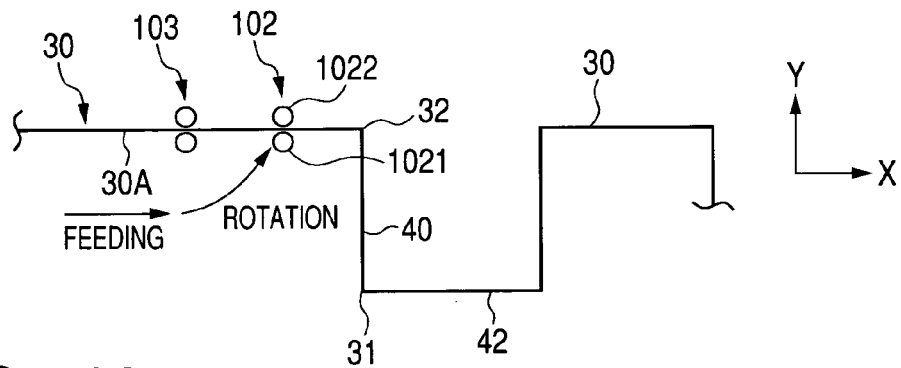
FIG. 12 is a view schematically showing the positional relationship among the tool sets and the wire at the placing step.

Thereafter, as shown in FIG. 12, the wire 30 is moved in the extending direction X by a second changeable length to place the tool set 103 at the third bending point of the wire 30 (placing step S702). Therefore, the straight portion 30A of the wire 30 is protruded from the tool set 103 in the extending direction X by the second changeable length. Then, the tool set 102 is returned to a force applying point of the wire 30. More specifically, the tool set 102 is rotated about the tool set 103 counterclockwise by an angle of 90 degrees and is put down or lowered so as to place the straight portion 30A of the wire 30 in the opening of the tool set 102.

Figure 13:
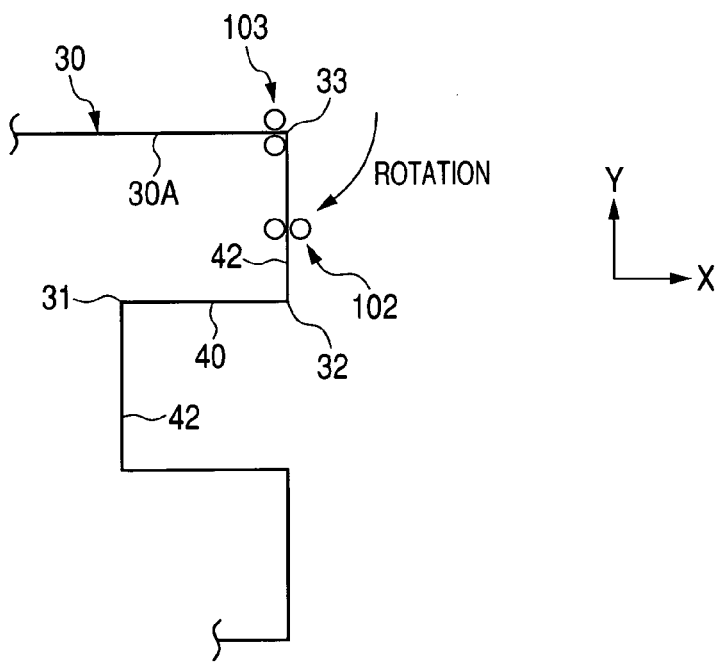
FIG. 13 is a view schematically showing the positional relationship among the tool sets and the wire at the moving step.

Thereafter, as shown in FIG. 13, the tool set 102 is rotated clockwise about the tool set 103 to bend the wire 30 at the third bending point by an angle to 90 degrees (moving step S703). Therefore, one boundary corner 33 is newly formed at the third bending point of the wire 30, and one coil end portion 42 to be placed on the other axial end of the core 12 (see FIG. 2) is formed between the newly-formed portion 33 and the boundary corner 32 previously formed. Then, the tool set 102 is lifted up to release the wire 30 from the tool set 102 (releasing step S704).

Figure 14:
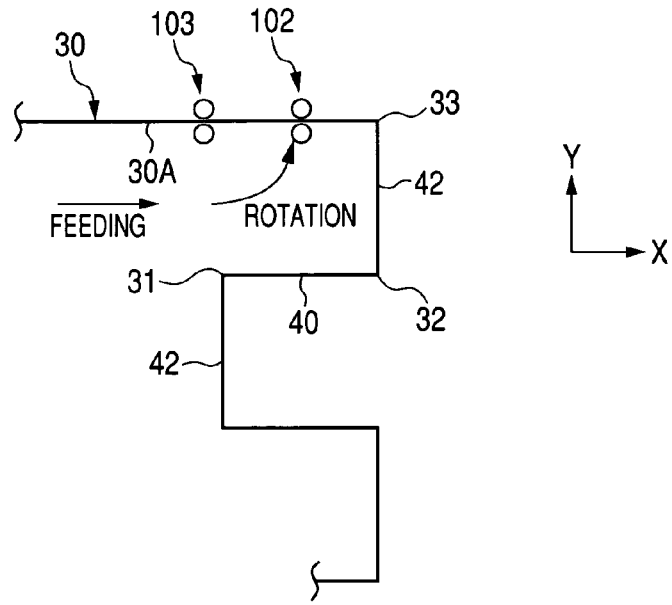
FIG. 14 is a view schematically showing the positional relationship among the tool sets and the wire at the placing step.

Thereafter, as shown in FIG. 14, the wire 30 is moved in the extending direction X by the fixed length to place the tool set 103 at the fourth bending point of the wire 30 (placing step S702). Therefore, the straight portion 30A of the wire 30 is protruded from the tool set 103 in the extending direction X by the fixed length. Then, the tool set 102 is returned to a force applying point of the wire 30. More specifically, the tool set 102 is rotated about the tool set 103 counterclockwise by an angle of 90 degrees and is put down or lowered so as to place the straight portion 30A of the wire 30 in the opening of the tool set 102.

Figure 15:
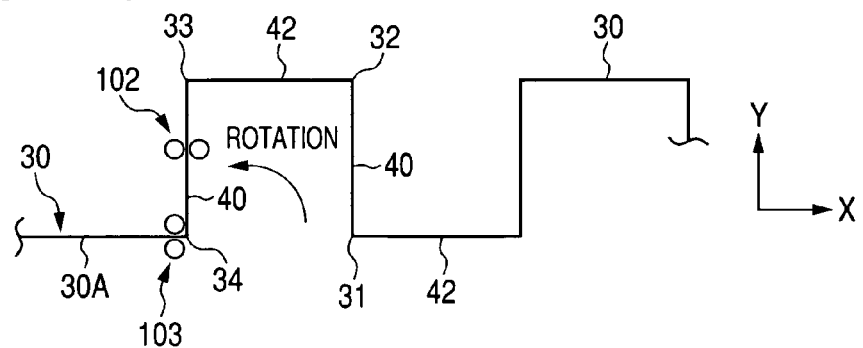
FIG. 15 is a view schematically showing the positional relationship among the tool sets and the wire at the moving step.

Thereafter, as shown in FIG. 15, the tool set 102 is rotated counterclockwise about the tool set 103 to bend the wire 30 at the fourth bending point by an angle of 90 degrees (moving step S703). Therefore, one boundary corner 34 is newly formed at the fourth bending point of the wire 30, and one slot accommodated portion 40 placed between the newly-formed portion 34 and the boundary corner 33 previously formed is formed. Then, the tool set 102 is lifted up to release the wire 30 from the tool set 102 (releasing step S704).

Figure 16:
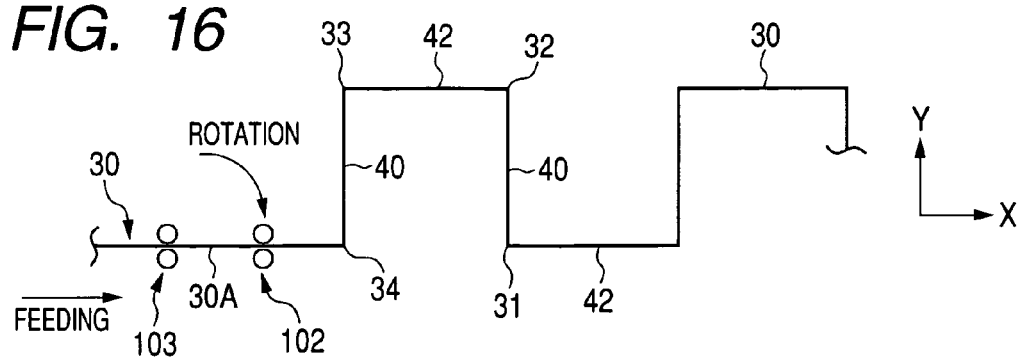
FIG. 16 is a view schematically showing the positional relationship among the tool sets and the wire at the placing step.

Thereafter, as shown in FIG. 16, the wire 30 is moved in the extending direction X by a third changeable length to place the tool set 103 at the fifth bending point of the wire 30 (placing step S702). Therefore, the straight portion 30A of the wire 30 is protruded from the tool set 103 in the extending direction X by the third changeable length. Then, the tool set 102 is returned to a force applying point of the wire 30. More specifically, the tool set 102 is rotated about the tool set 103 clockwise by an angle of 90 degrees and is put down so as to place the straight portion 30A of the wire 30 in the opening of the tool set 102.

Therefore, two coil end portions 40 and two slot accommodated portions 42 are formed in the process shown in FIG. 8 to FIG. 16. The positional relation among the wire 30 and the tool sets 102 and 103 shown in FIG. 16 is the same as that shown in FIG. 8. To form the wire 30 bent in a cranked shape, the process for bending the wire 30 shown in FIG. 8 to FIG. 16 is repeatedly performed.

Each changeable length of the wire 30 moved to form one coil end portion 42 is set according to a distance between two slots 14 or 15 of the core 12, into which two slot accommodated portions 40 connected with the coil end portion 42 are inserted at the coil inserting stage, at the position of the coil end portion 42 in the core 12 in the radial direction.

Further, the fixed length of the wire 30 moved to form one slot accommodated portion 40 is set according to a length of the slot 14 or 15, into which the slot accommodated portion 40 is inserted at the coil inserting stage, in the axial direction.

Thereafter, each coil end portion 42 is deformed in a stair-stepped shape (coil end shape forming stage). This deformation may be performed before the formation of the portions 31 and 32. Further, no coil end portion 42 may be deformed.

As described above, in this method, the wire 30 having a large sectional area of a rectangular shape is bent at each of the bending points to form the boundary corners 31 to 34 one by one, so that the wire 30 is formed in a cranked shape. Therefore, one phase winding is obtained from the bent wire 30, and the stator coil 20 formed in a corrugated and planar shape is produced from a plurality of phase windings. This planar coil 20 is rounded in a cylindrical shape to manufacture the stator coil 20 formed in the corrugated shape while extending in the circumferential direction. The slot accommodated portions 40 of this coil 20 are inserted into the slots 14 and 15 of the core 12, so that the stator 11 with the stator coil 20 is manufactured so as to have the coil end portions 42 on the axial ends of the core 12 (see FIG. 2).

Therefore, because the boundary corners 31 to 34 of the wire 30 are formed one by one, the tensile stress and/or the compression stress applied on the insulation film of the coil 20 can be considerably reduced. Further, during the formation of the boundary corners 31 to 34 in the wire 30, no tool collides with the wire 30 placed on the wire bending tool set 103, or the wire 30 is not tightly placed between tools. Therefore, the coil 20 hardly receives a mechanical impact. Accordingly, the stress applied on the insulation film of the coil 20 can be reduced to be lower than the allowable level of stress in the insulation film, the insulation film of the coil 20 is hardly damaged or broken, and yield rate improvement can be obtained in the manufacturing of the coil 20.

Further, in this method, because the boundary corners 31 to 34 of the wire 30 are formed one by one, the bending operation can be simplified, and the bending device 100 can be simplified.

Moreover, because the boundary corners 31 to 34 of the wire 30 are formed one by one, the length of each coil end portion 42 divided by two boundary corners can be easily set, and the length of each slot accommodated portion 40 divided by two boundary corners can be easily set. Therefore, the coil end portion 42 placed on the inner side of the core 12 in the radial direction can be set at a shorter length, and the coil end portion 42 placed on the outer side of the core 12 in the radial direction can be set at a longer length. Accordingly, even when the size of the stator 11 is changed, the size of the coil 20 can be appropriately adjusted.

Furthermore, the deformation of each coil end portion 42 is performed independent of the formation of the boundary corners 31 to 34. Accordingly, the tensile stress and/or the compression stress applied on the insulation film of the coil 20 can be further reduced, so that the wire 30 having a larger sectional area can be used for the coil 20.

Still further, the wire 30 is bent along the curved shape of the wall of the wire bending tool set 103. Accordingly, even when the sectional area of the wire 30 formed in the rectangular shape is large, the wire 30 can be easily and reliably bent approximately at an angle of 90 degrees on the tool set 103.

Still further, the tool set 102 is merely lifted up, put down, and rotated about the tool set 103 clockwise or counterclockwise. Therefore, these linear and rotational movements of the tool set 102 are simple. Accordingly, the bending device 100 can be further simplified, the coil 20 can be manufactured at low cost, and the productivity of the coils 20 can be improved.

Still further, the tool units 102 and 103 are detachably attached to the moving members 105 and 106 such as robot hands. Accordingly, even when the robot hands are generally used for another device, the robot hand can be easily used for the bending device 100 to move the tool units 102 and 103.

Still further, because the tool units 102 and 103 are detachably attached to the moving members 105 and 106, the tool units 102 and 103 can be easily replaced with other ones. Further, the columnar bending tools of each tool unit have the simple shape. Accordingly, even when the radius of curvature required for the boundary corners 31 to 34 is changed, the radius of curvature can be easily changed by replacing the tool unit 103 with another one, and this tool unit can be replaced at low cost.

Still further, when each coil end portion 42 is deformed in the stair-stepped shape, a deforming tool is additionally used. Accordingly, the bending device 100 can be further simplified and made in a smaller size.

Still further, the bending device 100 has the tool set 102 for applying the bending force to the wire 30 and the tool set 103 for bending the wire 30 on the surface thereof. Accordingly, the bending operation using the bending device 100 can be simplified.

Still further, the curved shape of the half-circle side walls of the tool set 103 is transferred to the boundary corners 31 to 34. Because the half-circle side walls of the tool set 103 are smoothly curved, the tensile stress and/or the compression stress applied on the insulation films of the portions 31 and 32 can be reduced.

In this embodiment, each bending tool of the tool units 102 and 103 has the side wall formed in the half-circle in section to bend a portion of the wire 30 placed on this wall. However, the shape of the bending tool is not limited to the half-circle in section. The bending tool may have a smoothly-curved side wall to smoothly bend a portion of the wire 30 placed on this wall approximately at an angle of 90 degrees without substantially giving any stress to the insulation film of the wire 30.

SECOND EMBODIMENT

In the first embodiment, the first tool-unit 102 is always set as a force applying tool set at the step S701. Therefore, only the tool set 102 is rotated. However, in this embodiment, each time the wire 30 is bent, one tool unit used as a force applying tool set is set as a wire bending tool set, and the other tool unit used as a wire bending tool set is set as a force applying tool set.

An example of the production of the stator coil 20 will be described with reference to FIG. 17 to FIG. 25. Each of FIG. 17, FIG. 19, FIG. 21, FIG. 23 and FIG. 25 is a view schematically showing the positional relationship among the tool sets 102 and 103 and the wire 30 at the placing step S702, while each of FIG. 18, FIG. 20, FIG. 22 and FIG. 24 is a view schematically showing the positional relationship among the tool sets 102 and 103 and the wire 30 at the moving step S703.

Figure 17:
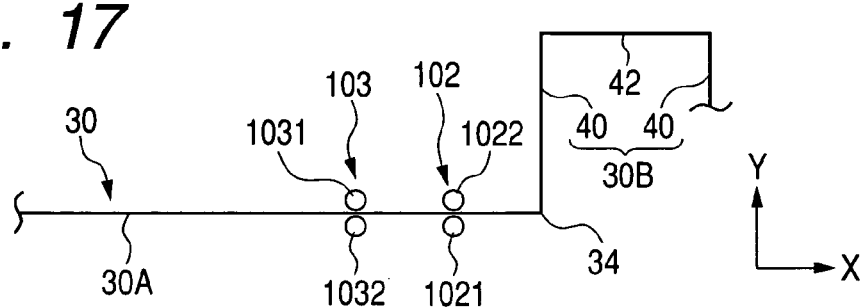
FIG. 17 is a view schematically showing the positional relationship among the tool sets and the wire at the placing step.

As shown in FIG. 17, the first tool unit 102 is set as a force applying tool set, and the second tool unit 103 is set as a wire bending tool set (setting step S701). The tool set 103 is placed at the first bending point of the wire 30 to protrude the straight portion 30A of the wire 30 by a first changeable length from the tool set 103 in the extending direction X and to put the wire 30 in the opening of the tool set 103. The tool set 102 is placed at a force applying point of the protruded portion 30A to put the wire 30 in the opening of the tool set 102 (placing step S702).

Figure 18:
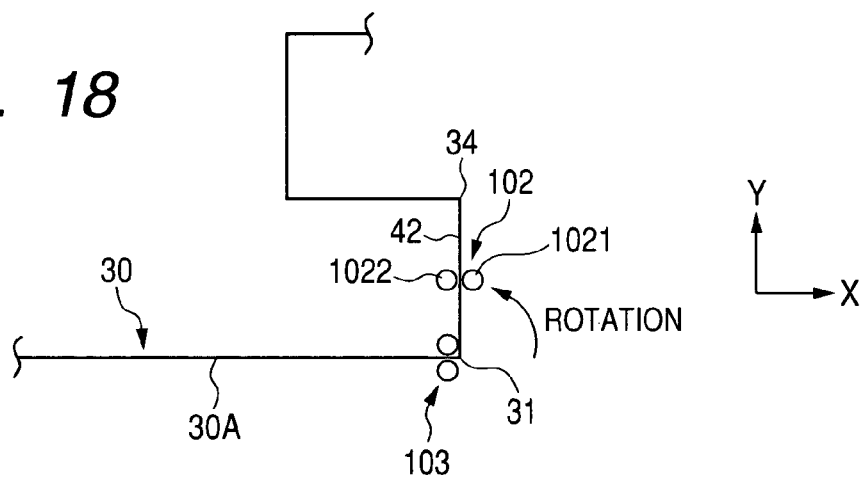
FIG. 18 is a view schematically showing the positional relationship among the tool sets and the wire at the moving step.

Thereafter, as shown in FIG. 18 the tool set 102 is rotated counterclockwise about the tool set 103 to bend the wire 30 at the first bending point by an angle of 90 degrees (moving step S703). Therefore, one boundary corner 31 is newly formed at the first bending point of the wire 30, and one coil end portion 42 to be placed on one axial end of the core 12 (see FIG. 2) is formed between the newly-formed portion 31 and the boundary corner 34 previously formed. Then, the tool set 102 is lifted up to release the wire 30 from the tool set 102 (releasing step S704).

Thereafter, the first tool unit 102 is set as a wire bending tool set, and the second tool unit 103 is set as a force applying tool set (setting step S701).

Figure 19:
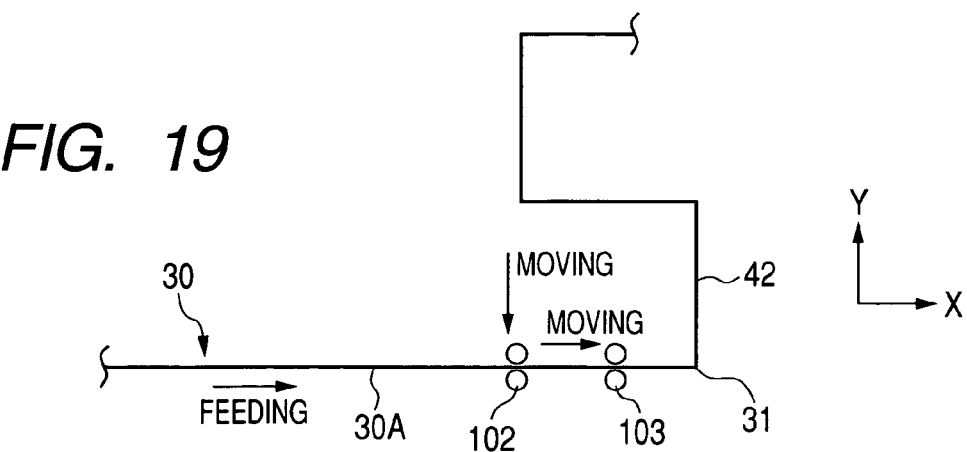
FIG. 19 is a view schematically showing the positional relationship among the tool sets and the wire at the placing step.

Thereafter, as shown in FIG. 19, the wire 30 is moved in the extending direction X by a fixed length, the tool set 103 is moved in the extending direction X by a predetermined distance smaller than the moving length of the wire 30, and the tool set 102 is moved in the direction Y perpendicular to the extending direction X to be placed just over the wire 30 and is put down so as to place the wire 30 in the opening of the tool set 102 (placing step S702). Therefore, the tool set 102 is placed at the second bending point of the wire 30, the wire 30 is protruded from the second bending point in the extending direction X by the fixed length, and the tool set 103 is placed at a force applying point of the protruded portion of the wire 30.

Figure 20:
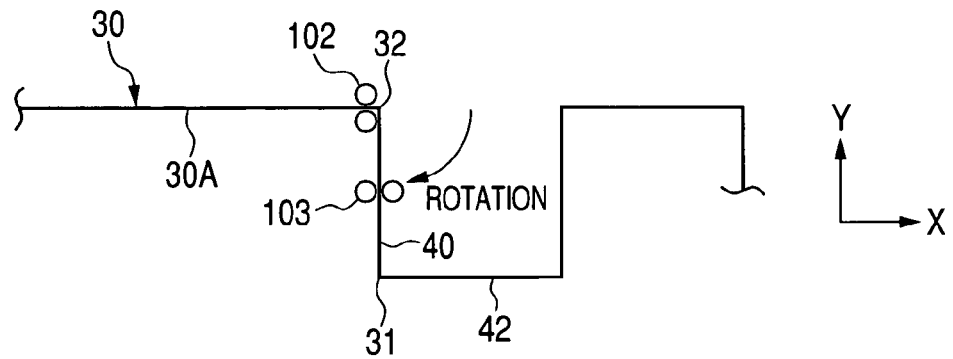
FIG. 20 is a view schematically showing the positional relationship among the tool sets and the wire at the moving step.

Thereafter, as shown in FIG. 20, the tool set 103 is rotated clockwise about the tool set 102 to bend the wire 30 at the second bending point by an angle of 90 degrees (moving step S703). Therefore, one boundary corner 32 is newly formed at the second bending point, and one slot accommodated portion 40 is formed between the newly-formed portion 32 and the boundary corner 31 previously formed. Then, the tool set 103 is lifted up to release the wire 30 from the tool set 103 (releasing step S704).

Thereafter, the first tool unit 102 is set as a force applying tool set, and the second tool unit 103 is set as a wire bending tool set (setting step S701).

Figure 21:
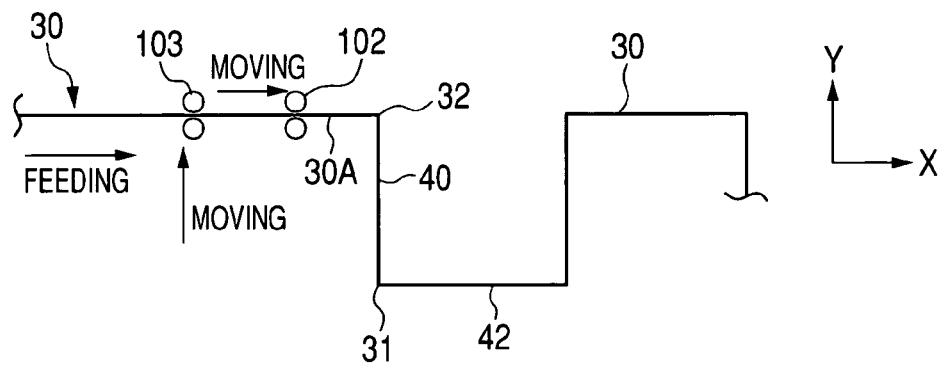
FIG. 21 is a view schematically showing the positional relationship among the tool sets and the wire at the placing step.

Thereafter, as shown in FIG. 21, the wire 30 is moved in the extending direction X by a second changeable length, the tool set 102 is moved in the extending direction X by a predetermined distance smaller than the moving length of the wire 30, and the tool set 103 is moved in the direction Y perpendicular to the extending direction X to be placed just over the wire 30 and is put down so as to place the wire 30 in the opening of the tool set 103 (placing step S702). Therefore, the tool set 103 is placed at the third bending point of the wire 30, the wire 30 is protruded from the third bending point in the extending direction X by the second changeable length, and the tool set 102 is placed at a force applying point of the protruded portion of the wire 30.

Figure 22:
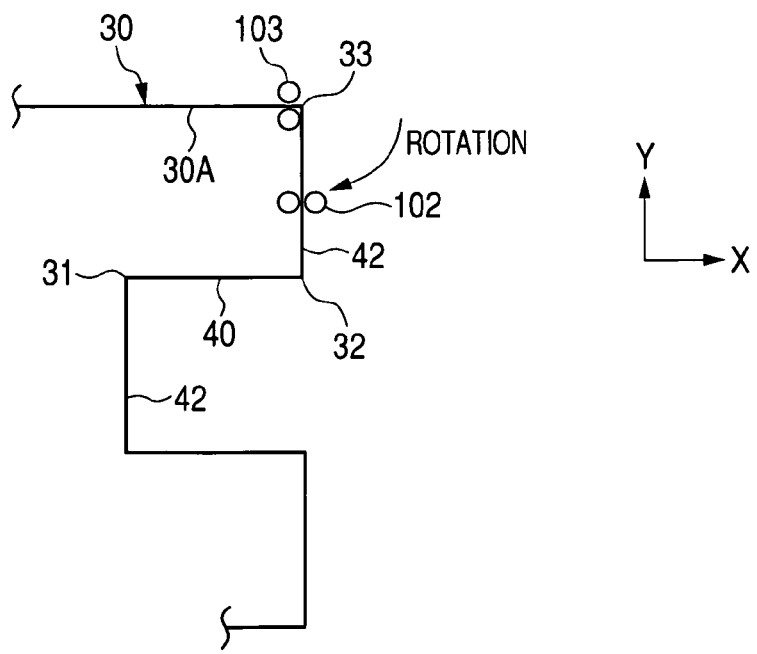
FIG. 22 is a view schematically showing the positional relationship among the tool sets and the wire at the moving step.

Thereafter, as shown in FIG. 22, the tool set 102 is rotated clockwise about the tool set 103 to bend the wire 30 at the third bending point by an angle of 90 degrees (moving step S703). Therefore, one boundary corner 33 is newly formed at the third bending point, and one coil end portion 42 is formed between the newly-formed portion 33 and the boundary corner 32 previously formed. Then, the tool set 102 is lifted up to release the wire 30 from the tool set 102 (releasing step S704).

Thereafter, the first tool unit 102 is set as a wire bending tool set, and the second tool unit 103 is set as a force applying tool set (setting step S701).

Figure 23:
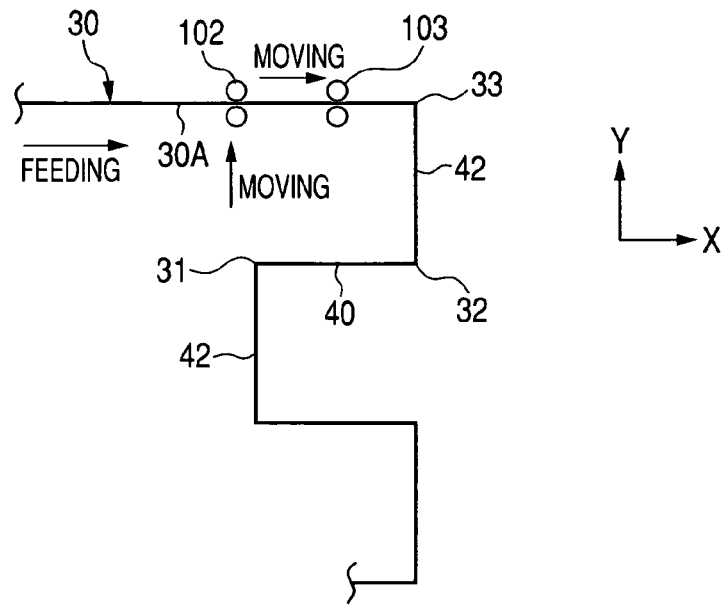
FIG. 23 is a view schematically showing the positional relationship among the tool sets and the wire at the placing step.

Thereafter, as shown in FIG. 23, the wire 30 is moved in the extending direction X by the fixed length, the tool set 103 is moved in the extending direction X by a predetermined distance smaller than the moving length of the wire 30, and the tool set 102 is removed in the direction Y perpendicular to the extending direction X to be placed just over the wire 30 and is put down so as to place the wire 30 in the opening of the tool set 102 (placing step S702). Therefore, the tool set 102 is placed at the fourth bending point of the wire 30, the wire 30 is protruded from the fourth bending point in the extending direction X by the fixed length, and the tool set 103 is placed at a force applying point of the protruded portion of the wire 30.

Figure 24:
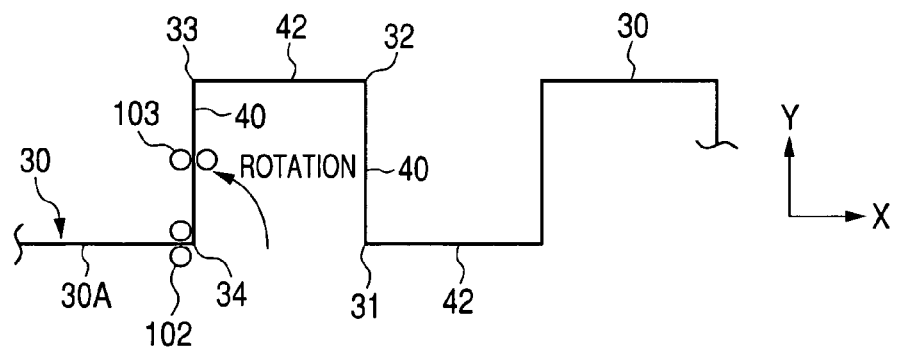
FIG. 24 is a view schematically showing the positional relationship among the tool sets and the wire at the moving step.

Thereafter, as shown in FIG. 24, the tool set 103 is rotated counterclockwise about the tool set 102 to bend the wire 30 at the fourth bending point by an angle of 90 degrees (moving step S703). Therefore, one boundary corner 34 is newly formed at the fourth bending point, and one slot accommodated portion 40 is formed between the newly-formed portion 34 and the boundary corner 33 previously formed. Then, the tool set 103 is lifted up to release the wire 30 from the tool set 103 (releasing step S704).

Thereafter, the first tool unit 102 is set as a force applying tool set, and the second tool unit 103 is set as a wire bending tool set (setting step S701).

Figure 25:
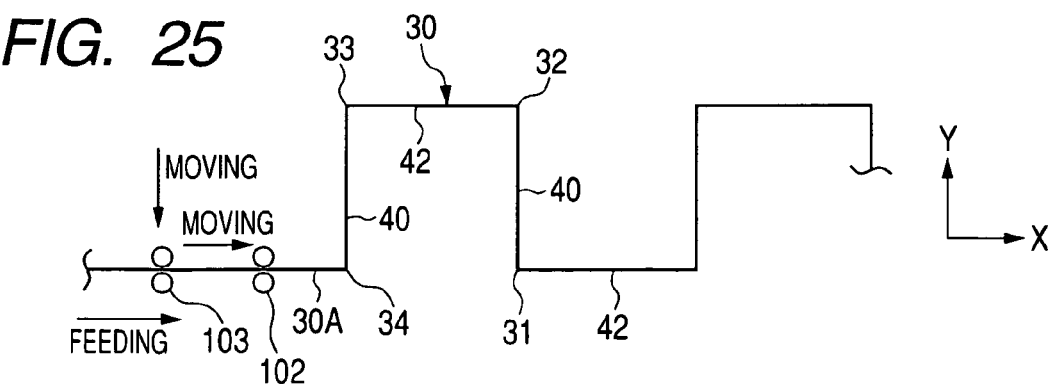
FIG. 25 is a view schematically showing the positional relationship among the tool sets and the wire at the placing step.

Thereafter, as shown in FIG. 25, the wire 30 is moved in the extending direction X by a third changeable length, the tool set 102 is moved in the extending direction X by a predetermined distance smaller than the moving length of the wire 30, and the tool set 103 is moved in the direction Y perpendicular to the extending direction X to be placed just over the wire 30 and is put down so as to place the wire 30 in the opening of the tool set 103 (placing step S702). Therefore, the tool set 103 is placed at the fifth bending point of the wire 30, the wire 30 is protruded from the fifth bending point in the extending direction X by the third changeable length, and the tool set 102 is placed at a force applying point of the protruded portion of the wire 30.

Therefore, two coil end portions 40 and two slot accommodated portions 42 are formed in the process shown in FIG. 17 to FIG. 25. The positional relation among the wire 30 and the tool sets 102 and 103 shown in FIG. 25 is the same as that shown in FIG. 17. To form the wire 30 bent in a cranked shape, the process for bending the wire 30 shown in FIG. 17 to FIG. 25 is repeatedly performed.

The changeable lengths of the wire 30 are determined in the same manner as in the first embodiment.

Thereafter, each coil end portion 42 is deformed in the stair-stepped shape in the same manner as in the first embodiment (coil end shape forming stage), and the stator 11 with the stator coil 20 formed in the corrugated shape while extending in the circumferential direction is manufactured.

As described above, even when each of the tool sets 102 and 103 alternately acts as a force applying tool set and a wire bending tool set, the same effects as those in the first embodiment can be obtained.

In the first and second embodiments, at the moving step S704, the force applying tool set is moved, while the wire bending tool set s fixed. However, both the tool sets 102 and 103 may be moved at the moving step S704 such that the force applying tool set is moved relative to the wire bending tool set to bend the wire 20.

Further, in the first and second embodiments, only one pair of tool units 102 and 103 is used to form the coil 20 in the corrugated shape. However, another pair of tool units may be used with the tool units 102 and 103 to form the coil 20 in the corrugated shape. In this case, one pair of tool units is placed at the position different from that of the other pair of tool units and are operated synchronous with the other pair of tool units to simultaneously form two boundary corners.

Moreover, in the first and second embodiments, only one tool set 102 or 103 is lifted up at the releasing step S704 to release the wire 30 from the tool set. However, both the tool sets 102 and 103 may be lifted up at the releasing step S704 to release the wire 30 from the tool sets.

THIRD EMBODIMENT

The deformation of each coil end portion 42 at the coil end shape forming stage will be described. This deformation is performed each time four boundary corners 31 to 34 are formed in the wire 30 at the coil bending stage according to the first or second embodiment to form two coil end portions 42.

A die (i.e., a member of an additional deforming tool) is detachably attached to the moving member 105 with the tool set 102, and a punch (i.e., another member of the additional deforming tool) is detachably attached to the moving member 106 with the tool set 103. The die and the punch are shaped to deform one coil end portion 42, placed between the die and the punch and pressed by the punch, in the stair-stepped shape.

Each time four boundary corners 31 to 34 are formed in the wire 30, the moving member 105 moves the die to place each of two newly-formed coil end portions 42 on the die, and the moving member 106 moves the punch to place the coil end portion 42 between the die and the punch and to press the coil end portion 42. Therefore, each of the coil end portions 42 is deformed in the stair-stepped shape.

In this embodiment, the center 43 of each coil end portion 42 may be bent in the radial direction to shift one half of the portion 42 from the other half of the portion 42 by the thickness of the wire 30 in the radial direction (radial directional bending stage). Therefore, the coil 20 fitted to the core 12 can smoothly form a plurality of layers in the radial direction. This bending operation may be performed for a portion of the wire 30 planned to be formed into one coil end portion 42 before the coil end portion 42 is formed in the wire 30.

These embodiments should not be construed as limiting the present invention to the procedure of those embodiments, and the procedure of this invention may be combined with that based on the prior art.

What is claimed is:

1. A method for manufacturing a stator coil formed in a corrugated shape, comprising:

a coil forming stage of forming the stator coil in a planar shape from a conductive wire, covered with an insulation film, to have a plurality of boundary corners at bending points of the wire and to have a plurality of slot accommodated portions and a plurality of coil end portions alternately arranged and divided by the boundary corners; and a coil inserting stage of rounding the planar stator coil and inserting the slot accommodated portions of the rounded stator coil into slots of a stator core, while allowing the coil end portions of the stator coil to protrude from axial ends of the stator core, to manufacture the stator coil formed in the corrugated shape, the coil forming stage comprising;

a setting step of setting one of two tool units, each of which has a wall and an opening facing the wall, as a wire bending tool set and setting the other tool set as a force applying tool set;

a placing step of placing the wire bending tool set at one of the bending points of the wire so as to protrude a portion of the wire by a predetermined length from the wire bending tool set while putting the wire in the opening of the wire bending tool set, and placing the force applying tool set at a force applying point of the protruded portion of the wire while putting the wire in the opening of the force applying tool set;

a moving step of moving the force applying tool set relative to the wire bending tool set to apply a bending force onto the wire at the force applying point through the wall of the force applying tool set, to induce the wire to come in contact with the wall of the wire bending tool set at the bending point, and to bend the wire at the bending point in response to the bending force while forming one boundary corner of the wire at the bending point and forming one slot accommodated portion or one coil end portion substantially having the predetermined length between the boundary corner and another boundary corner previously formed; and a releasing step of releasing the wire from at least one of the tool sets, which are repeatedly performed in that order to produce the stator coil having a predetermined number of boundary corners, formed one by one, from the wire.

2. The method according to claim 1, wherein the moving step includes bending the conductive wire substantially by an angle of 90 degrees.

3. The method according to claim 1, wherein the moving step includes transferring a shape of the wall of the wire bending tool set to the wire to form the boundary corner in the wall shape.

4. The method according to claim 1, wherein the placing step includes moving the conductive wire to protrude the portion of the wire by the predetermined length from the wire bending tool set.

5. The method according to claim 1, wherein the coil forming stage further comprises:

a preparing step of preparing each of the tool sets to have a first columnar bending tool and a second columnar bending tool extending in a first direction substantially perpendicular to an extending direction of the wire, to place the opening between the bending tools, and to have a first side wall of the first bending tool and a second side wall of the second bending tool facing each other through the opening, and the moving step of the coil forming stage comprises:

applying the bending force onto the conductive wire through the first side wall of the force applying tool set;

bending the wire along the second wall of the wire bending tool set; and transferring a shape of the second wall of the wire bending tool set to the conductive wire to give a radius of curvature of the second side wall of the wire bending tool set to the boundary corner of the wire.

6. The method according to claim 1, wherein the conductive wire has a sectional area of a rectangular shape.

7. The method according to claim 1, wherein the placing step includes:

setting the predetermined length of the portion of the wire according to a distance between two slots of the stator core, substantially formed in a cylindrical shape, at a radial position of the stator core in a radial direction of the stator core when the coil end portion substantially having the predetermined length is formed at the moving step subsequent to the placing step to insert two slot accommodated portions adjacent to the coil end portion into the two slots in the coil inserting stage and to place the coil end portion at the radial position; and setting the predetermined length of the portion of the wire according to a length of one slot of the stator core in an axial direction of the stator core when the slot accommodated portion substantially having the predetermined length is formed at the moving step subsequent to the placing step to be inserted into the slot in the coil inserting stage.

8. The method according to claim 1, wherein the coil forming stage includes:

detachably attaching the tool sets to a tool driving unit to move the tool sets in three dimensions at each of the placing step, the moving step and the releasing step.

9. The method according to claim 8, wherein the coil forming stage includes;

detachably attaching an additional deforming tool to the tool driving unit; and deforming the coil end portions of the stator coil by means of the additional deforming tool moved by the tool driving unit.

* * * * *